Patented May 26, 1936

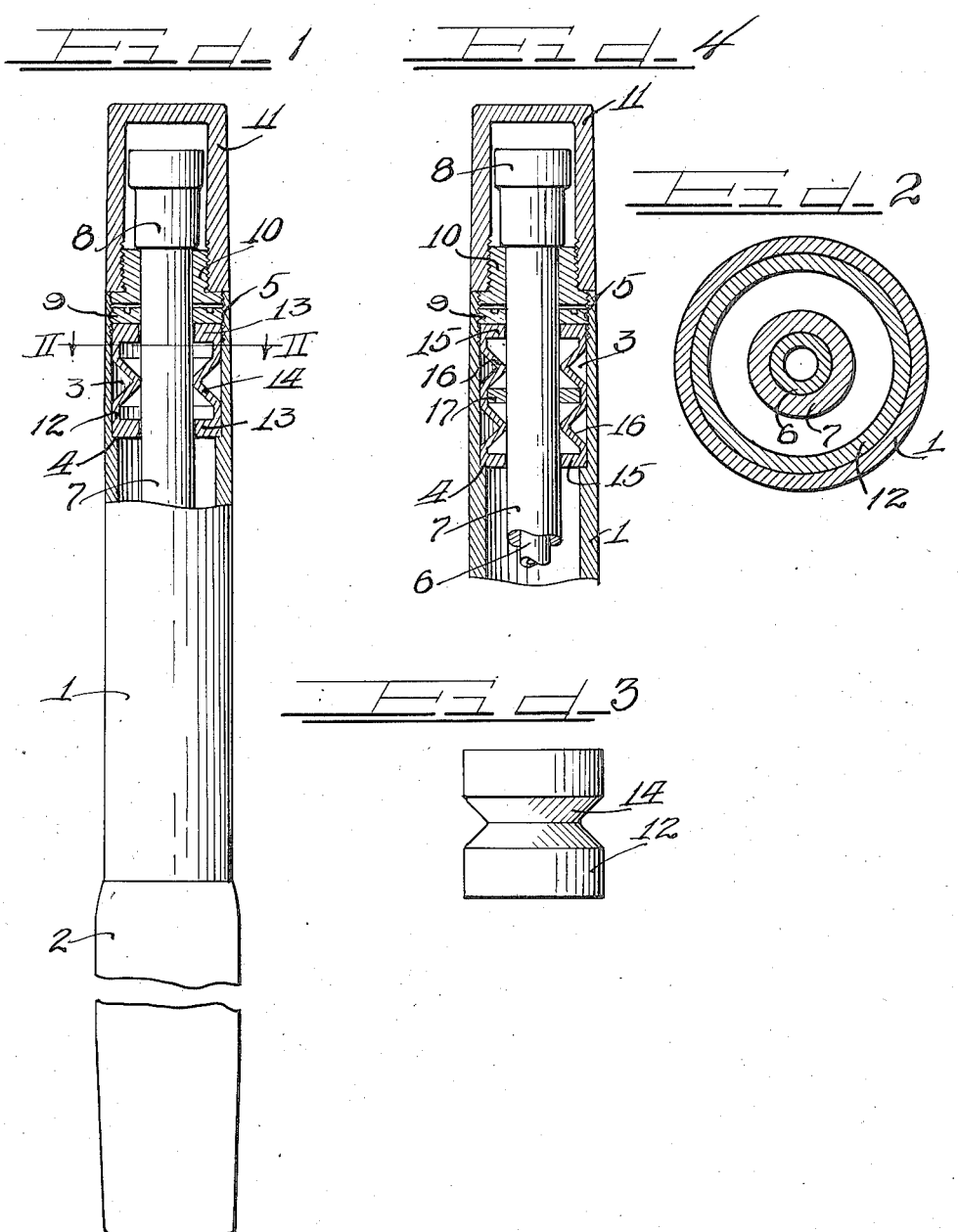

2,041,781

UNITED STATES PATENT OFFICE 2,041,781

FOUNTAIN PEN PACKING UNIT

Solomon M. Sager, Glencoe, Ill.

Application November 15, 1934, Serial No. 753,088

5 Claims. (Cl. 286—35)

The present invention relates to fountain pens and more particularly to a fountain pen packing unit adapted to be mounted in a fountain pen barrel in coacting engagement with a slidable plunger or the like, and in contact with an adjustable means for varying the frictional contact of the packing unit with the fountain pen plunger mechanism.

It is an object of this invention to provide a flexible packing unit provided with one or more sealing ridges or rings within the packing unit and intermediate the ends thereof for close fitting packing contact with a fountain pen filling plunger mounted to slidably project axially through the packing unit.

It is also an object of this invention to provide a fountain pen packing unit constructed of flexible material and including one or more bellows type sealing members positioned to have a sealing and wiping contact with a filling member of the fountain pen projecting through the packing unit.

It is a further object of this invention to provide a fountain pen packing unit including end portions and an intermediate portion with the end portions constructed of heavier material than the intermediate portion which is inwardly adjustable into frictional sealing engagement with an axial member projecting through the packing unit when the end portions of the packing unit are moved toward one another.

It is furthermore an object of this invention to provide a rubber packing unit having heavy rubber end portions which are adjustable with respect to one another for adjusting a V-cross-sectioned intermediate portion of lighter weight rubber into frictional sealing contact with a movable member around which the packing unit is engaged.

It is furthermore an object of this invention to provide a fountain pen packing unit in the form of a rubber sleeve having heavy rubber mounting ends and lighter weight rubber intermediate pleated portions for holding a washer of absorbent material in position around a movable member which has frictional engagement with the pleated portions of the packing unit.

It is an important object of this invention to provide a fountain pen with a resilient packing unit and means for adjusting the same, said packing unit including a V-cross-sectioned or bellows type intermediate section positioned between mounting ends which are adjustable with respect to one another for the purpose of varying the frictional pressure of the intermediate section of the packing unit with a slidable fountain pen part projecting through the packing unit.

Other and further important objects of this invention will be apparent from the disclosure in the specification and the accompanying drawing.

The invention (in a preferred form) is illustrated in the drawing and hereinafter more fully described.

On the drawing:

Figure 1 is an enlarged fragmentary elevational view of a fountain pen partly shown in sections to disclose a sectional view of a packing unit embodying the principles of this invention and associated with means for adjusting the same within the fountain pen barrel.

Figure 2 is an enlarged cross-sectional view taken on line II—II of Figure 1.

Figure 3 is an elevational view of the packing unit removed from the fountain pen.

Figure 4 is a fragmentary sectional view of one end of a fountain pen disclosing a modified form of packing unit shown in position engaged around the fountain pen plunger.

As shown on the drawing:

Referring to Figures 1, 2 and 3 of the drawing, the reference numeral 1 indicates a fountain pen barrel having a cap 2 removably engaged on one end thereof. The opposite end of the barrel 1 has the walls thereof reduced in thickness to provide an enlarged chamber 3 which extends inwardly a short distance and terminates at a shoulder 4. The end portion of the wall forming the chamber 3 is internally threaded at 5.

The fountain pen is of the plunger filling type and includes an ink intake tube 6 which is disposed axially within the barrel and projects upwardly into a filling plunger stem 7 provided with an operating head 8.

As clearly illustrated in Figure 1, the plunger stem 4 projects axially through an improved packing unit which is tightly engaged in the barrel chamber 3 and has the inner end thereof seated against the stop shoulder 4. The outer end of the packing unit is contacted by an adjustable apertured locking disk or ring 9 which is externally threaded and has threaded engagement with the threaded portion 5 of the fountain pen barrel. The ring 9 is provided with a pair of openings or a groove to receive a tool for rotating the ring to adjust the same. A flanged end closure plug or guide member 10 is externally threaded and engaged in the end of the barrel 1 to the outside of the locking ring 9. An internally threaded chambered end cap or hood 11 is removably engaged on the plug 10 to enclose the operating head 8 of the plunger mechanism. The closure ring 9 is adjustable within the threaded end of the barrel 1 for the purpose of holding the packing unit tightly seated in position and furthermore serves as a means for compressing the packing unit to control or vary the frictional sealing contact which the packing unit has with the slidable plunger stem 7.

The improved packing unit which is engaged in the enlarged chamber 3 of the fountain pen barrel and which surrounds the plunger stem 7, comprises a cylindrical body portion 12 constructed of rubber or other flexible and resilient material. Integrally formed on both ends of the rubber sleeve or body portion 12 are apertured end walls 13 which are constructed of greater thickness than the side or body walls of the sleeve 12 to form stiffer or stronger end walls for the packing unit. The intermediate or body portion of the rubber sleeve 12 is pleated or deflected inwardly to form V-cross-sectioned or inwardly tapered sealing or packing rings or beads 14 adapted to fit closely around the plunger stem 7 to form a tight non-leakable fit with the slidable plunger stem where it passes through the packing unit. For the purpose of varying the sealing or contacting pressure of the packing ring or bead 14 against the surface of the slidable plunger stem 7, the adjustable ring 9 may be threaded inwardly within the fountain pen barrel 1 to move the outer end of the packing unit closer to the inner end of the packing unit thereby causing the pleated or V-shaped sealing portion of the packing unit to be compressed and thereby moved into tighter frictional contact with the outer surface of the plunger stem 7. The sealing portion 14 of the packing unit is of the bellows type so that with the compression of the packing unit the intermediate portion of the packing unit is resiliently forced into tighter wiping contact with the plunger stem when the stem is reciprocated to cause filling of the fountain pen barrel. In case frictional engagement of the bellows portion 14 of the packing unit with the plunger stem 7 is too great, the adjustable ring 9 is threaded outwardly to release the pressure on the packing unit thereby permitting the sealing or intermediate portion of the unit to reduce the frictional engagement of the intermediate portion 14 of the packing unit with the plunger stem.

Figure 4 which also shows a fragmentary sectional view of one end of a fountain pen includes a modified form of packing unit of a multiple bellows type. The modified form of packing unit comprises centrally apertured heavy rubber end sections 15 connected integrally by a thinner rubber intermediate body section comprising a plurality of V-cross-sectioned packing rings or bellows 16, the inner edges or beads of which are positioned for frictional contact with a reciprocating plunger stem 7 of the fountain pen to provide a non-leaking joint where the plunger stem projects through the packing unit. Seated within the packing unit between the sealing bellows or rings 16, is a washer 17 constructed of felt or other yieldable absorbent material which if desired may contain a lubricant. The plunger stem 7 projects axially through the packing unit and through the felt washer 17 contained therein.

As mentioned in connection with the packing unit illustrated in Figure 1, the modified form of packing unit is adapted to be compressed or adjusted by means of the adjustable closure ring 9. Inward movement of the closure ring 9 will cause compression of the multiple type packing unit to cause both of the sealing bellows or packing rings 16 to be pressed more tightly against the outer surface of the filling plunger stem 7 of the fountain pen. Outward movement of the ring 9 with respect to the fountain pen barrel will, of course, release the compression on the packing unit so that the sealing bellows may have the frictional engagement thereof reduced in case they press too tightly against the plunger stem 7.

It will, of course, be understood that various details of construction may be varied through a wide range without departing from the principles of this invention and it is therefore not the purpose to limit the patent granted hereon otherwise than necessitated by the scope of the appended claims.

I claim as my invention:

1. A packing unit comprising a chambered rubber body apertured to permit a member to be slidably projected therethrough, V-cross-sectioned rings projecting inwardly from the sides of the body into sealing contact with said member, a washer of yieldable absorbent material engaged in the body between said rings and in contact with said member, and adjustable means to longitudinally compress said rubber body.

2. A packing unit comprising a rubber body formed to permit a member to be slidably projected therethrough, a plurality of beveled ribs integrally formed in said body and in sealing contact with said member to form a non-leaking joint, a felt washer in said body between a pair of said ribs, and adjustable means to longitudinally compress said rubber body.

3. A packing unit for a fountain pen and adapted to provide a resilient support and seal for a filler rod reciprocable in said unit, said unit comprising an elongated body of rubber, or the like, formed to define a bellows having a collapsible wall terminated at each end in an integrally formed and passaged annular flange of materially greater thickness than the collapsible wall of the bellows, and a washer of yieldable material in the bellows and extending transversely of said body.

4. In an elongated casing open at one end and having a reciprocable rod extending through the open end, means adapted to form a closure for the open end of the casing and a resilient guide for the rod, said means comprising an elongated body of rubber, or the like, formed to define a bellows terminated at each end in an integrally formed and passaged annular flange of materially greater thickness than the collapsible wall of the bellows.

5. In a fountain pen, an elongated casing open at one end, a filler rod reciprocable in said casing and extending through the open end, means forming a closure for the open end of the casing and a resilient guiding support for said rod, said closure means comprising an elongated body of rubber, or the like, formed to define a bellows having a collapsible wall and passaged end flanges of materially greater thickness than the collapsible wall, said body being positioned in the casing at the open end thereof, and encircling said rod, and means in said casing engaging said flanges to longitudinally compress said rubber body.

SOLOMON M. SAGER.